(12) United States Patent
Smeeton

(10) Patent No.: US 12,732,050 B2
(45) Date of Patent: Sep. 8, 2026

(54) ELECTRICAL MACHINE HAVING STATOR SLEEVE

(71) Applicant: ROLLS-ROYCE plc, London (GB)

(72) Inventor: Paul A. Smeeton, Derby (GB)

(73) Assignee: Rolls-Royce plc, London (GB)

( * ) Notice: Subject to any disclaimer, the term of this patent is extended or adjusted under 35 U.S.C. 154(b) by 356 days.

(21) Appl. No.: 18/532,196

(22) Filed: Dec. 7, 2023

(65) Prior Publication Data

US 2024/0213842 A1 Jun. 27, 2024

(30) Foreign Application Priority Data

Dec. 23, 2022 (GB) ..................................... 2219617

(51) Int. Cl.

| | |
|---|---|
| ***H02K 3/30*** | (2006.01) |
| ***H02K 3/42*** | (2006.01) |
| ***H02K 3/493*** | (2006.01) |

(52) U.S. Cl.
CPC ................ *H02K 3/30* (2013.01); *H02K 3/42* (2013.01); *H02K 3/493* (2013.01)

(58) Field of Classification Search
CPC ...... B01D 2201/0415; B01D 2201/162; B01D 2201/305; B01D 2201/46; B01D 29/21; B01D 29/54; B01D 35/153; B01D 35/16; H02K 1/02; H02K 3/30; H02K 3/42; H02K 3/493; H02K 5/128; Y02E 10/50
See application file for complete search history.

(56) References Cited

U.S. PATENT DOCUMENTS

| | | | | |
|---|---|---|---|---|
| 4,600,873 A * | 7/1986 | Roesel, Jr. | ............. | H02K 21/46 318/705 |
| 5,990,588 A * | 11/1999 | Kliman | .................. | H02K 3/493 310/86 |
| 8,040,007 B2 * | 10/2011 | Petrov | .................... | H02K 1/278 310/156.28 |
| 12,362,624 B2 * | 7/2025 | Berendes | ............... | H02K 9/197 |
| 2004/0145267 A1 * | 7/2004 | Lowry | ................... | H02K 3/493 310/215 |
| 2010/0019589 A1 * | 1/2010 | Saban | ................. | H02K 5/1285 310/216.069 |
| 2014/0312716 A1 | 10/2014 | Hunter et al. | | |

FOREIGN PATENT DOCUMENTS

| | | | |
|---|---|---|---|
| CN | 1126900 A | 7/1996 | |
| GB | 436145 A | 10/1935 | |
| GB | 611020 A | 10/1948 | |
| GB | 2509738 A * | 7/2014 | ............ H02K 5/128 |

OTHER PUBLICATIONS

European search report dated May 14, 2024, issued in EP Patent Application No. 23211634.3.
Great Britain search report issued in GB Patent Application No. 2219617.4. dated May 3, 2023.

* cited by examiner

*Primary Examiner* — Naishadh N Desai

(57) ABSTRACT

There is provided an electrical machine comprising: a rotor at least partially disposed within a rotor chamber; a stator core coaxially arranged with the rotor chamber; and a stator sleeve. The stator sleeve is annular and is positioned between the stator core and the rotor chamber. The stator sleeve comprises a magnetic material having a relative permeability of at least and an intrinsic coercivity no greater than 1 $kAm^{-1}$.

18 Claims, 7 Drawing Sheets

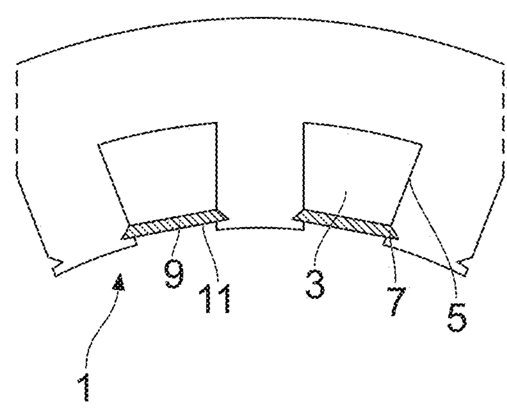
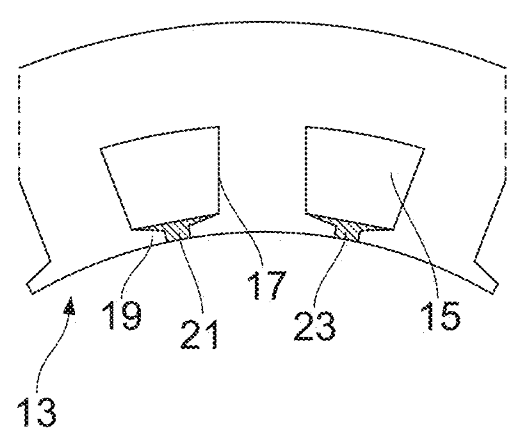
FIG. 2A
FIG. 2B
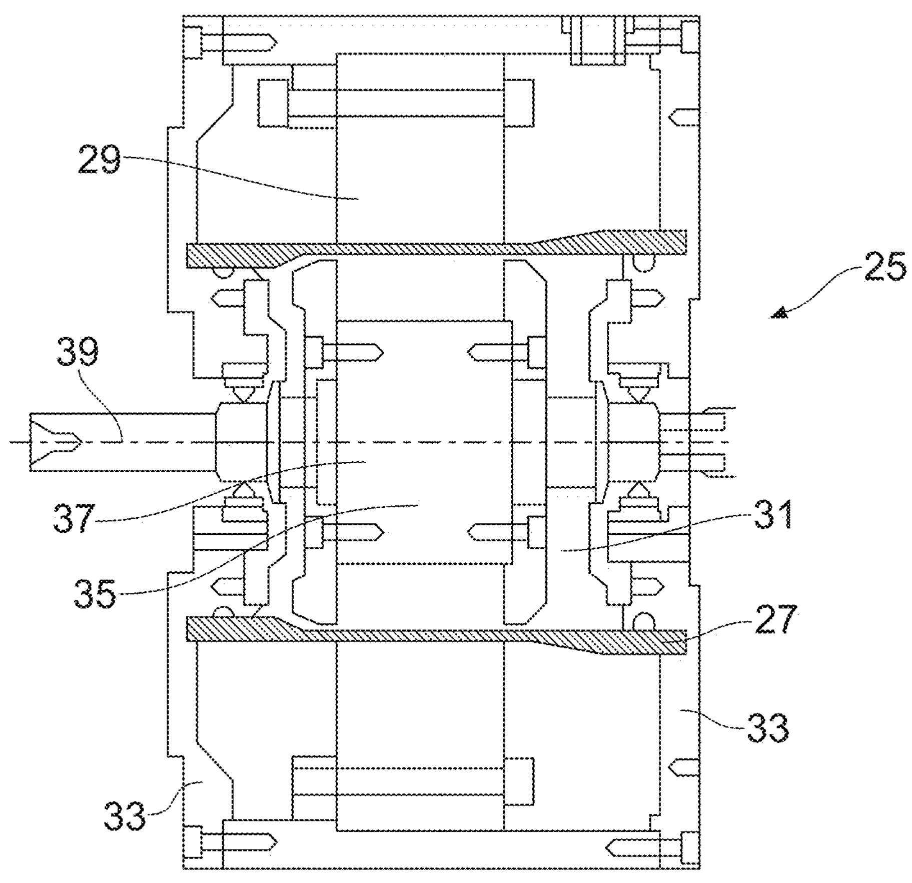
FIG. 3

SECTION A-A 620 621 634 634 634 632 610 632 632 633 39A 39R 39C

FIG. 6C

SECTION A-A 610 620 620 634 634 632 632 632 633 39A 39R 39C

FIG. 6B

ELECTRICAL MACHINE HAVING STATOR SLEEVE

CROSS-REFERENCE TO RELATED APPLICATIONS

This specification is based upon and claims the benefit of priority from United Kingdom Patent Application No. 2219617.4, filed 23 Dec. 2022, the entire contents of which are incorporated herein by reference.

TECHNICAL FIELD

This disclosure concerns an electrical machine comprising a rotor at least partially disposed within a rotor chamber, a stator core, and a stator sleeve positioned between the stator core and the rotor chamber.

BACKGROUND

In electrical machine design, it is known to use a stator sleeve extending from one end-cap of a casing of the electrical machine to another end-cap of the casing and separating a stator core from a rotor chamber. This may be useful where it is desirable to prevent the ingress of fluid and/or material from the stator core to the rotor chamber and/or vice versa. It may be for example that the rotor chamber is exposed to exhaust gas containing contaminants which should be kept away from the stator core and windings. A stator core may be flooded with coolant liquid in intimate contact with the stator windings and core. This may facilitate higher power densities for the electrical machine, but generally requires that the liquid is contained within the stator region and not allowed to flood the rotor chamber. A stator sleeve may also preserve, where present, a pressure differential between the stator core and rotor chamber (as may occur in vacuum pumps, for instance). In each case the stator sleeve provides a barrier between the stator core and the rotor chamber. However, the stator sleeve also passes through a main working air gap of the electrical machine. This reduces a magnitude of flux density produced by the rotor magnets within the main working air gap and at the windings.

Consequently, the torque density of the machine (and so its electromagnetic performance) is reduced. From an electromagnetic performance perspective, it is therefore desirable to reduce the stator sleeve thickness. Nonetheless, the stator sleeve thickness can only be reduced to a limited extent in order to maintain the mechanical rigidity of the stator sleeve under a particular fluid pressure differential. Further, it may be that a minimum stator sleeve thickness is needed to ensure the stator sleeve can be reliably manufactured and assembled in an electrical machine. For better performance of an electrical machine having a stator sleeve, it is desirable to provide an improved stator sleeve for use therein.

GB2509738A describes a stator sleeve made from a high strength non-conductive polymer (e.g., polyether ether ketone), a carbon fibre or glass fibre composite or a non-magnetic metal (e.g., titanium).

SUMMARY

According to a first aspect there is provided an electrical machine comprising: a rotor at least partially disposed within a rotor chamber, a stator core coaxially arranged with the rotor chamber, and a stator sleeve, wherein: the stator sleeve is annular and is positioned between the stator core and the rotor chamber; and the stator sleeve comprises a magnetic material having a relative permeability of at least 10 and an intrinsic coercivity no greater than 1 $kAm^{-1}$.

The magnetic material may have a relative permeability of at least 100 or at least 10,000. The magnetic material may have an intrinsic coercivity no greater than 1000 $Am^{-1}$. Further, the intrinsic magnetic coercivity of the magnetic material may be no less than 0.2 $Am^{-1}$ and the relatively permeability of the magnetic material may be no greater than 1,000,000. It may be that the magnetic material comprises iron, an iron-cobalt alloy, nickel and/or a nickel-iron alloy.

The stator core may be disposed around the rotor chamber. Alternatively, the rotor chamber may be disposed around the stator core. The stator sleeve may provide a fluid seal between the rotor chamber and the stator core. The stator sleeve may have a composite structure comprising a matrix and a filler distributed in the matrix, wherein the filler comprises the magnetic material. It may be that the filler comprises particulates distributed in the matrix, with the matrix separating the particulates to electrically insulate the particulates. Additionally or alternatively, it may be that the filler comprises elongate wires extending through the matrix, with the matrix separating the elongate wires to electrically insulate the elongate wires.

The composite structure may further comprise a fibre reinforcement material disposed within the matrix. The matrix and the fibre reinforcement material may together occupy at least 80% of the composite structure by volume. The matrix and the fibre reinforcement material may together occupy no greater than 95% of the composite structure by volume. The fibre reinforcement material may comprise glass fibres and/or carbon fibres.

It may be that the stator sleeve is concentric with a rotational axis of the rotor and the fibre reinforcement material comprises fibres which are elongate along the rotational axis.

Further, it may be that the stator sleeve is defined by a circumferential direction and the fibre reinforcement material comprises a plurality of fibres which are elongate along the circumferential direction.

The matrix may comprise a polymer resin. The matrix may comprise a thermosetting polymer resin. It may be that the thermosetting polymer resin is an epoxy based resin or cyanate-ester based resin. The thermosetting polymer resin may comprise (e.g., consist of) silicone, polyamide or polyimide.

It may be that: the stator core defines a plurality of stator core slots; the stator sleeve comprises a plurality of slot wedges; and the stator core and the stator sleeve are mechanically engaged such that each slot wedge blocks an opening of a respective stator core slot. It may also be that each slot wedge comprises a magnetic material having a relative permeability of at least 10 and an intrinsic coercivity no greater than 1 $kAm^{-1}$. The magnetic material may have a relative permeability of at least 100 or at least 10,000. The magnetic material may have an intrinsic coercivity no greater than 1000 $Am^{-1}$. Further, the intrinsic magnetic coercivity of the magnetic material may be no less than 0.2 $Am^{-1}$ and the relatively permeability of the magnetic material may be no greater than 1,000,000. It may be that the magnetic material comprises iron, an iron-cobalt alloy, nickel and/or a nickel-iron alloy. According to a second aspect there is provided method of operating an electrical machine according to the first aspect, wherein the stator core defines a plurality of stator core slots in which a respective stator winding is provided, the method comprising: operating the electrical machine in a baseline condition; and operating the electrical machine in a fault condition in which the stator windings are electrically connected to each other to form a short-circuit, wherein the stator sleeve provides additional effective inductance to the stator windings such that a fault current induced within the stator windings is inhibited. The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only with reference to the accompanying drawings, which are purely schematic and not to scale, and in which:

FIG. 2A shows a cross-section through a portion of a prior art stator core;

FIG. 2B shows a cross-section through a portion of an alternative prior art stator core;

FIG. 3 shows a cross-section through an example electrical machine having a stator sleeve;

FIG. 6B is a detailed cross-section through a stator sleeve having a composite structure which includes a fibre reinforcement material comprising a plurality of reinforcing fibres arranged in respective directions FIG. 6C is a detailed cross-section through a stator sleeve having a composite structure which includes a fibre reinforcement material comprising a plurality of reinforcing fibres arranged in respective directions.

DETAILED DESCRIPTION

Figure 1:
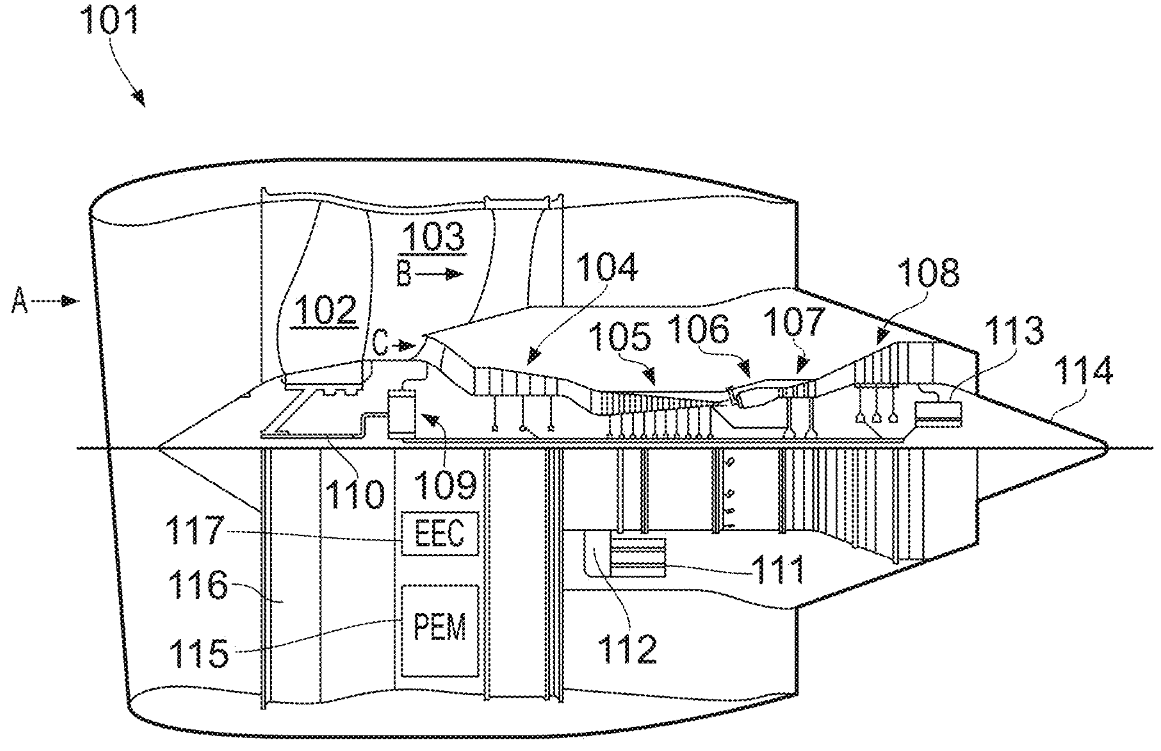
FIG. 1 shows a general arrangement of a turbofan engine for an aircraft.

A general arrangement of an engine 101 for an aircraft is shown in FIG. 1. The engine 101 is of turbofan configuration, and thus comprises a ducted fan 102 that receives intake air A and generates two pressurised airflows: a bypass flow B which passes axially through a bypass duct 103 and a core flow C which enters a core gas turbine.

The core gas turbine comprises, in axial flow series, a low-pressure compressor 104, a high-pressure compressor 105, a combustor 106, a high-pressure turbine 107, and a low-pressure turbine 108.

In operation, the core flow C is compressed by the low-pressure compressor 104 and is then directed into the high-pressure compressor 105 where further compression takes place. The compressed air exhausted from the high-pressure compressor 105 is directed into the combustor 106 where it is mixed with fuel and the mixture is combusted. The resultant hot combustion products then expand through, and thereby drive, the high-pressure turbine 107 and in turn the low-pressure turbine 108 before being exhausted to provide a small proportion of the overall thrust.

The high-pressure turbine 107 drives the high-pressure compressor 105 via an interconnecting shaft. The low-pressure turbine 108 drives the low-pressure compressor 104 via another interconnecting shaft. Together, the high-pressure compressor 105, high-pressure turbine 107, and associated interconnecting shaft form part of a high-pressure spool of the engine 101. Similarly, the low-pressure compressor 104, low-pressure turbine 108, and associated interconnecting shaft form part of a low-pressure spool of the engine 101. Such nomenclature will be familiar to those skilled in the art. Those skilled in the art will also appreciate that whilst the illustrated engine has two spools, other gas turbine engines have a different number of spools, e.g., three spools.

The fan 102 is driven by the low-pressure turbine 108 via a reduction gearbox in the form of a planetary-configuration epicyclic gearbox 109. Thus, in this configuration, the low-pressure turbine 108 is connected with a sun gear of the gearbox 109. The sun gear is meshed with a plurality of planet gears located in a rotating carrier, which planet gears are in turn meshed with a static ring gear. The rotating carrier drives the fan 102 via a fan shaft 110. It will be appreciated that in alternative embodiments a star-configuration epicyclic gearbox (in which the planet carrier is static, and the ring gear rotates and provides the output) may be used instead, and indeed that the gearbox 109 may be omitted entirely so that the fan 102 is driven directly by the low-pressure turbine 108.

It is increasingly desirable to facilitate a greater degree of electrical functionality on the airframe and on the engine. To this end, the engine 101 of the present embodiment comprises one or more rotary electric machines, generally capable of operating both as a motor and as a generator. The number and arrangement of the rotary electric machines will depend to some extent on the desired functionality. Some embodiments of the engine 101 include a single rotary electric machine 111 driven by the high-pressure spool, for example by a core-mounted accessory drive 112 of conventional configuration. Such a configuration facilitates the generation of electrical power for the engine and the aircraft and the driving of the high-pressure spool to facilitate starting of the engine in place of an air turbine starter. Other embodiments, including the one shown in FIG. 1, comprise both a first rotary electric machine 111 coupled with the high-pressure spool and a second rotary electric machine 113 coupled with the low-pressure spool. In addition to generating electrical power and the starting the engine 101, having both first and second rotary machines 111, 113, connected by power electronics, can facilitate the transfer of mechanical power between the high and lower pressure spools to improve operability, fuel consumption etc.

As mentioned above, in FIG. 1 the first rotary electric machine 111 is driven by the high-pressure spool by a core-mounted accessory drive 112 of conventional configuration. In alternative embodiments, the first electric machine 111 may be mounted coaxially with the turbomachinery in the engine 101. For example, the first electric machine 111 may be mounted axially in line with the duct between the low- and high-pressure compressors 104 and 105. In FIG. 1, the second electric machine 113 is mounted in the tail cone 114 of the engine 101 coaxially with the turbomachinery and is coupled to the low-pressure turbine 108. In alternative embodiments, the second rotary electric machine 113 may be located axially in line with low-pressure compressor 104, which may adopt a bladed disc or bladed drum configuration to provide space for the second rotary electric machine 113. It will of course be appreciated by those skilled in the art that any other suitable location for the first and (if present) second electric machines may be adopted.

The first and second electric machines 111, 113 are connected with power electronics. Extraction of power from or application of power to the electric machines is performed by a power electronics module (PEM) 115. In the present embodiment, the PEM 115 is mounted on the fan case 116 of the engine 101, but it will be appreciated that it may be mounted elsewhere such as on the core of the gas turbine, or in the vehicle to which the engine 101 is attached, for example.

Control of the PEM 115 and of the first and second electric machines 111 and 113 is in the present example performed by an engine electronic controller (EEC) 117. In the present embodiment the EEC 117 is a full-authority digital engine controller (FADEC), the configuration of which will be known and understood by those skilled in the art. It therefore controls all aspects of the engine 101, i.e., both of the core gas turbine and the first and second electric machines 111 and 113. In this way, the EEC 117 may holistically respond to both thrust demand and electrical power demand.

The one or more rotary electric machines 111, 113 and the power electronics 115 may be configured to output to or receive electric power from one, two or more dc busses. The dc busses allow for the distribution of electrical power to other engine electrical loads and to electrical loads on the airframe. The dc busses may further receive electrical power from, or deliver electrical power to, an energy storage system such as one or more battery modules or packs.

Those skilled in the art will appreciate that the gas turbine engine 101 described above may be regarded as a 'more electric' gas turbine engine because of the increased role of the electric machines 111, 113 compared with those of conventional gas turbines.

Referring now to FIG. 2A a portion of a prior art stator core is generally provided at 1. The stator core 1 is cylindrical in shape (not all shown) and has stator core slots 3 spaced at fixed intervals around its circumference. The slots 3 are bounded by slot side walls 5, which are provided with notches 7. The notches 7 retain a slot wedge 9 which sits within the slot 3, blocking an opening 11 at the radially innermost end of the slot 3. Unless the slot wedge 9 fails (structurally or in its engagement with the notches 7) it will retain stator windings (not shown) within the slot 3.

FIG. 2B shows a portion of an alternative prior art stator core generally provided at 13. As before the stator core 13 is cylindrical in shape (not all shown) and has stator core slots 15 spaced at fixed intervals around its circumference.

The stator slots 15 are bounded by slot side walls 17 which project circumferentially towards each other at the radially innermost end of the slot to produce a pair of extending rims 19. The extending rims 19 retain a slot wedge 21 which sits within the slot 15, blocking an opening 23 at the radially innermost end of the slot 15. Unless the slot wedge 21 fails it will retain stator windings (not shown) within the slot 15.

As will be appreciated the slot and slot wedge arrangements of FIGS. 2A and 2B have disadvantages.

In the embodiment of FIG. 2A the use of notches 7 mean that the slot wedge 9 must sit further into (radially outwards) the slot 3, thus reducing the slot field factor. Further the thickness of the wedge 9 must alone be sufficient to withstand the forces exerted by the windings (not shown). The resulting relatively thick wedge 9 may further reduce the slot fill factor. Additionally, the slot wedge 9 may be prone to failure by disengagement from the notches 7 as a result of differing thermal expansion rates of the stator core 1 and slot wedge 9 (especially where the slot wedge 9 is subjected to vibration).

In the embodiment of FIG. 2B the use of the extending rims 19 to seat the slot wedge 21 again reduces the size of the slot 15 and therefore the slot fill factor.

In accordance with prior art electrical machines, where separation of the stator core 1, 13 and a rotor chamber (positioned radially inward of the stator core) is required, a stator sleeve is used. FIG. 3 shows a cross-section through an example electrical machine 25. A stator sleeve 27 is shown positioned between a stator core 29 and a rotor chamber 31. In the example of FIG. 3, the stator core 29 is coaxially arranged with and disposed around the rotor chamber 31 and the following description is provided with reference to such an electrical machine. However, it will be understood that the principles of the present disclosure may be equally applied to electrical machines in which the rotor chamber 31 is coaxially arranged with and disposed around the stator core 29 (which may be referred to as an "inside-out radial flux machine" or an "outrunner radial flux machine"). The stator sleeve 27 is annular (e.g., cylindrical) in shape and extends from one end-cap 33 of the machine 25 to the other. The stator sleeve 27 therefore spans and extends axially beyond a main working air-gap 35 of the machine 25 into an area where the stator end windings (not shown) are located. The stator sleeve 27 provides a fluid seal between the rotor chamber 31 and the stator core 29 and thereby, in use, the stator sleeve 27 prevents the ingress of fluid and/or material from the stator core 29 to the rotor chamber 31 and/or vice versa.

The stator sleeve 27 provides a fluid seal between a rotor 37 in the rotor chamber 31 and the stator core 29. The rotor 37 is configured to rotate about a rotational axis 39. In the example of FIG. 3, the rotor 37 is partially disposed within the rotor chamber 31. However, this disclosure envisages that the rotor 37 may be entirely disposed within the rotor chamber 31. As will be appreciated in order to perform this function adequately the stator sleeve 27 is of sufficient strength to withstand fluid pressures that it may encounter, and such strength may be a function of thickness. In particular the stator core 29 may contain coolant fluid that is pumped around the stator core 29 and particularly into contact with the components of the stator to be cooled, such as internal winding connections (not shown), end windings (not shown) and an active core of the stator (not shown). As will be appreciated however stator sleeves 27 having greater thicknesses are disadvantageous from an electromagnetic performance perspective because the stator sleeve 27 passes through the main working air-gap 35 of the machine 25, reducing the magnetic flux density experienced by the windings (not shown).

The electrical machine 25 may be, for instance, a permanent magnet machine such as a permanent-magnet synchronous machine (PMSM) in which the rotor 37 comprises a plurality of permanent magnets in an appropriate arrangement. Otherwise, the electrical machine may be, for example, a wound-rotor synchronous machine (WRSM) in which the rotor comprises a plurality of electromagnets in an appropriate arrangement, each electromagnet being required to be supplied with an excitation current for operation. The excitation current may be a direct-current (DC) excitation current, such that the excitation current is substantially constant (e.g., fixed) in use. Instead, the excitation current may be an alternating-current (AC) excitation current, such that the excitation current is substantially variable in use. Alternatively, the electrical machine 25 may be, for example, an asynchronous machine (which may also be referred to as an induction machine).

Figure 4A:
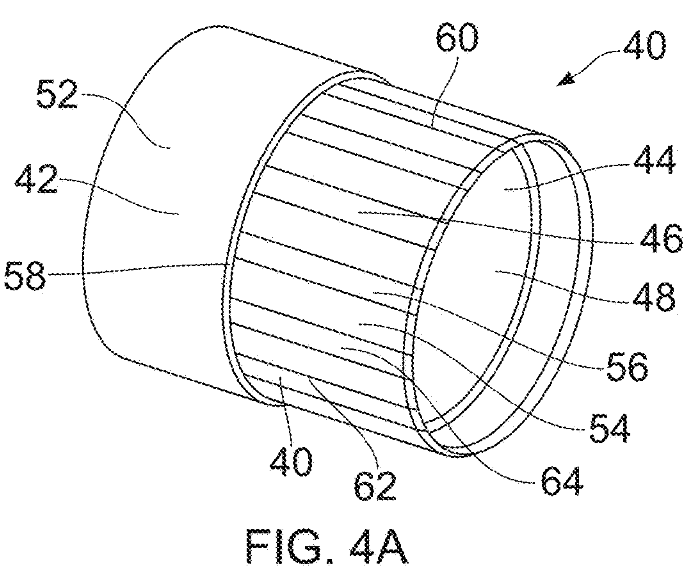
FIG. 4A is a perspective view of a first example stator sleeve.
Figure 4B:
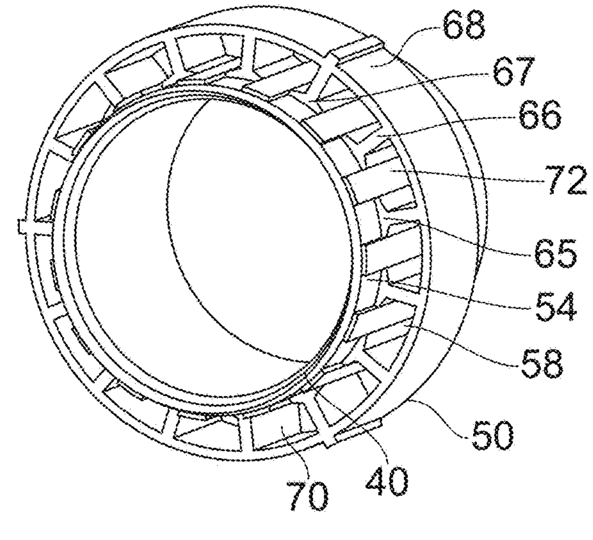
FIG. 4B is a perspective view of the stator sleeve of FIG. 4A engaged with a stator core.
Figure 4C:
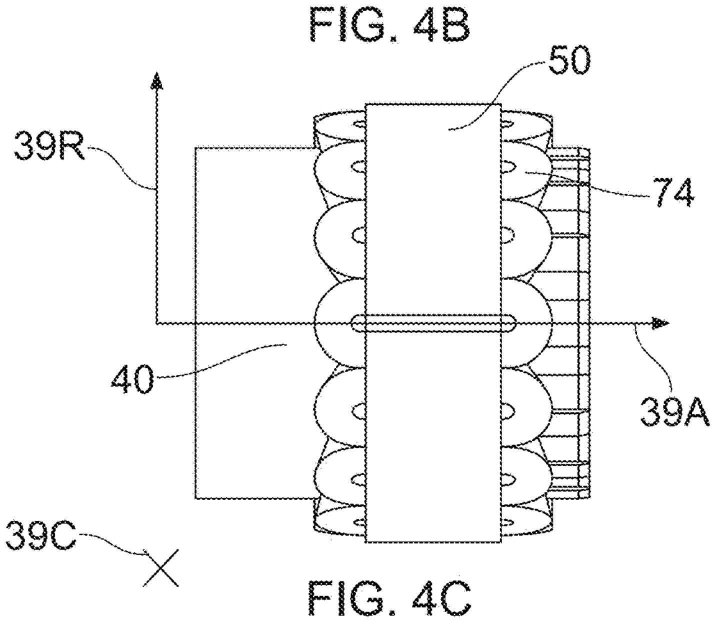
FIG. 4C is a perspective view of the stator sleeve and stator core of FIG. 4B with stator windings.

Referring now to FIGS. 4A-4C a first example stator sleeve is generally provided at 40. The stator sleeve 40 is cylindrical, rigid and unbroken in that it does not have through bores or other passages through its wall 42. The material characteristics of the stator sleeve 40 are discussed in further detail below. The wall 42 has an interior 44 and exterior 46 surface. The interior surface 44 defines a rotor chamber 48 and is arranged in use to receive the rotor (not shown) of an electrical machine (such as the electrical machine 25 described with respect to FIG. 3). The exterior surface 46 is arranged to engage with a stator core 50 positioned radially outward of the stator sleeve 40.

The stator sleeve 40 is defined by an axial direction 39A which extends along a length of the stator sleeve 40 and is parallel to a geometrical centreline of the stator sleeve 40 and also coincident with a rotational axis of a rotor (such as the rotational axis 39 of the rotor 37 described in the context of the example electrical machine 25) when the rotor is received within the rotor chamber 48. Therefore, the stator sleeve 40 is concentric with the rotational axis 39 of the rotor 37 when the rotor is received within the rotor chamber 48. Further, the stator sleeve 40 is defined by a circumferential direction 39C and a radial direction 39R. The radial direction 39R extends from the geometrical centreline of the stator sleeve 40 through the wall 42 along directions perpendicular to the axial direction 39A. The circumferential direction 39C is mutually perpendicular to the axial direction 39A and the radial direction 39R and extends angularly around the axial direction 39A. As such, the circumferential direction 39C is circumferential with respect to the rotational axis 39. Accordingly, the axial direction 39A, the radial direction 39R and the circumferential direction 39C constitute a cylindrical coordinate system, as will be appreciated by those skilled in the art.

The wall 42 has an end region 52, troughs 54 and ribs 56. The end region 52 extends axially from one end of the sleeve 40 to approximately half its length. The troughs 54 and ribs 56 extend axially from the end of the end region 52 to the other end of the sleeve 40. The troughs 54 and ribs 56 alternate around the full circumference of the sleeve 40 so as to form a castellated pattern. The wall 42 in the end region 52 is thicker than at the troughs 54 and ribs 56. The wall 42 is thicker at the ribs 56 than at the troughs 54. At the ribs 56 the exterior surface 46 has a greater radial extent than in the troughs 54. Further in the end region 52 the exterior surface 46 has a greater radial extent than at the ribs 56. Consequently, the exterior surface 46 defines an abutment wall 58 extending radially at an interface between the end region 52 and troughs 54 and ribs 56.

Each rib 56 has two circumferential sides 60, each of which has a rebated portion 62 beneath a top surface 64 of the rib 56. Each rebated portion 62 is arranged to receive a tooth 65 of the stator core 50. Teeth 65 of the stator core extend circumferentially in both directions from radially extending legs 66. The base surface 67 of each tooth 65 arranged to contact a trough 54 are radiused to match the curvature of the trough 54 in the circumferential direction.

As will be appreciated however in other embodiments the base surface 67 may be flat and may co-operate with a local flat provided in the exterior surface 46 at the trough 54. The radially extending legs 66 of the stator core 50 are joined by an outer annulus 68. When the stator core 50 and the exterior surface 46 of the sleeve 40 are slid together with the legs 66 aligned with the troughs 54, the teeth 65 interlock with the rebated portions 62. The precision fit of the sleeve inside the stator core 50 prevents relative radial and circumferential movement between the sleeve 40 and the stator core 50. Contact between the abutment wall 58 and the legs 66 also prevents axial migration of sleeve 40 in one direction.

With the stator core 50 and sleeve 40 mechanically engaged, the ribs 56 act as slot wedges 72, blocking openings in stator core slots 70 defined by the legs 66 and outer annulus 68. As can be seen in FIG. 4B, stator windings 74 are provided in the plurality of slots 70 and are retained by the ribs 56.

The integral nature of the slot wedges 72 and sleeve 40 may improve the resistance of the slot wedge 72 to failure and especially radial displacement. Further the reinforcement provided by the slot wedges 72 may mean that that parts of the sleeve 40 (i.e., the troughs 54) can be thinner than in prior art systems without compromising the sealing capabilities or strength of the sleeve 40. This may improve electromagnetic performance.

Figure 5A:
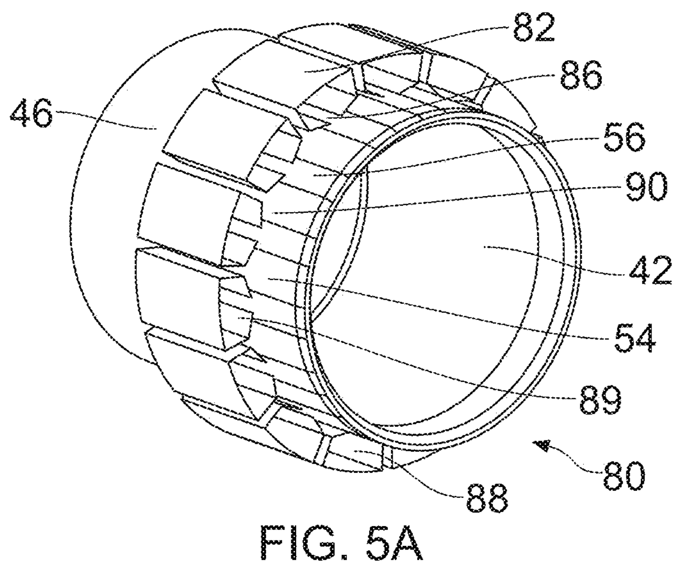
FIG. 5A is a perspective view of a second example stator sleeve.
Figure 5B:
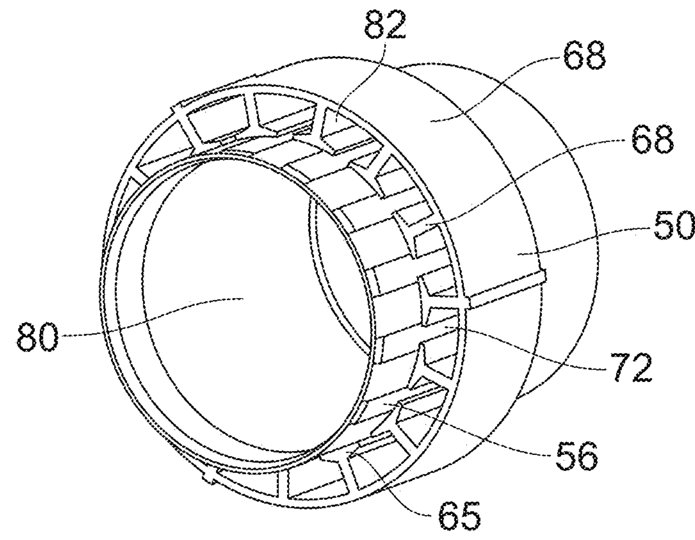
FIG. 5B is a perspective view of the stator sleeve of FIG. 5A engaged with a stator core.
Figure 5C:
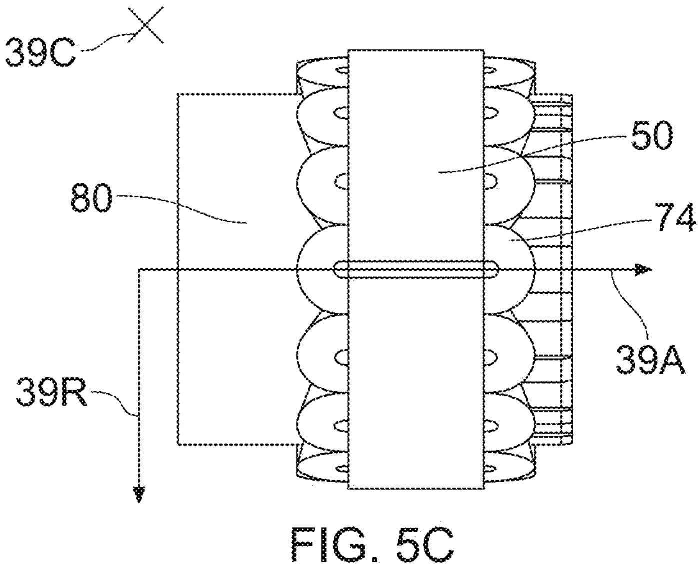
FIG. 5C is a perspective view of the stator sleeve and stator core of FIG. 5B with stator windings.

Referring now to FIGS. 5A-5C, a second example stator sleeve is generally shown at 80. The stator sleeve 80 is similar to the stator sleeve 40 and like reference numerals are used for like features. The only difference is the additional provision of stator core slot liners 82 that are integral with the sleeve 80. The liners 82 extend radially outwards from the exterior surface 46 and with the rib 56 forming a base wall 86. The liner 82 defines an internal space 88 which is substantially cone frustrum in shape, modified by a pair of ramp surfaces 89 which extend from the base wall 86. The ramp surfaces 89 define a pair of rebated portions 90, one either side of the rib 56, between the liner 82 and a respective trough 54.

As can be seen in FIG. 5B each liner 82 is a precision fit inside the slot 70 defined by the legs 66 and outer annulus 68 of the stator core 50. Engagement between the stator core 50 and sleeve 80 may therefore be achieved as previously by sliding the two 50, 80 relative to each other. Further the ribs 56 continue to act as slot wedges 72. The teeth 65 of the stator core 50 engage the rebated portions 90, negating the need for rebated portions 62, although these may still be provided. As can be seen in FIG. 5C, stator windings 74 are provided in the slots 70 inside of the liners 82 and are retained by the ribs 56.

In accordance with the present disclosure, the stator sleeve 40, 80 has a relatively high effective magnetic permeance. The stator sleeve 40, 80 is therefore configured to provide an increased permeance of a magnetic circuit within an electrical machine in which it is incorporated (such as the electrical machine 25 described above). To this end, the stator sleeve 40, 80 comprises a magnetic material. The stator sleeve 40, 80 may have a composite structure comprising the magnetic material and one or more other materials. Optionally, each of the slot wedges 72 comprises a magnetic material. If present, it may be that none of the stator core slot liners 82 comprise a magnetic material to ensure that an electrically insulative property of the liners 82 is preserved. The magnetic material is a soft magnetic material having an intrinsic magnetic coercivity no greater than 1 $kAm^{-1}$ and having a relative permeability of at least 10. If typical magnetic materials are used for the stator sleeve 40, 80, the intrinsic magnetic coercivity of the magnetic material may be no less than 0.2 $Am^{-1}$ and the relatively permeability may be no greater than 1,000,000. Optionally, the magnetic material may have a relative permeability of at least 100 or at least 10,000 (e.g., magnetic material comprising an iron-cobalt alloy are known to have a relative permeability of at least 10,000) for yet higher effective magnetic permeance of the stator sleeve 40, 80. Similarly, the magnetic material may be defined as a material having an intrinsic magnetic coercivity no greater than 1000 $Am^{-1}$. Use of a soft magnetic material (as opposed to a hard magnetic material) ensures that there is no adverse interaction between a magnetic field associated with the stator sleeve 40, 80 and a magnetic field produced by the stator windings 74 during operation. The magnetic material may comprise iron, for example an iron-cobalt alloy and/or nickel, for example a nickel-iron alloy (e.g. a mu-metal). Specific example structural and material compositions of a stator sleeve 40, 80 which achieve a relatively high effective permeance are described below with reference to FIGS. 6A-6C.

The stator sleeve 40, 80 having a relatively high effective permeance reduces a length of an effective working magnetic air-gap between the rotor and stator windings 74 of an electrical machine in which the stator sleeve 40, 80 is incorporated. This increases a permeance of (i.e., reduces a reluctance of) a magnetic circuit formed between the rotor and the stator windings 74 when the electrical machine is in use. In turn, this is associated with an increased torque density of the electrical machine when compared to a previously-considered electrical machine having the same radial size.

When the electrical machine 25 in which the stator sleeve 40, 80 is included is in an external short-circuit fault condition (e.g. if a set of terminals which are configured to connect the external load to the stator windings 74 of the electrical machine 25 are connected to each other such that the stator windings 74 are connected to each other to form a short circuit) and the rotor 37 is rotating, the only electrical load applied to the electrical machine 25 is an electrical load associated with an electrical impedance of the stator windings 74. As will be understood by those skilled in the art, the impedance of the stator windings 74 is principally composed of an electrical inductance of the stator windings 74 (as opposed to an electrical resistance or an electrical capacitance of the stator windings 74). Therefore, a fault current induced within the stator windings 74 is primarily influenced by the electrical impedance of the stator windings 74 and the induced voltage within the stator windings 74.

In a previously-considered electrical machine having a stator sleeve which does not have a relatively high effective permeance, an effective inductance of the stator windings may be relatively low. It follows that a fault current induced within the stator windings when the electrical machine is in an external short-circuit fault condition is relatively large.

In contrast, in an electrical machine 25 according to the present disclosure, the stator sleeve 40, 80 having a relatively high permeance provides additional effective inductance to the stator windings 74. As a result, the fault current induced within the stator windings 74 when the electrical machine 25 is in the external short-circuit fault condition is relatively small (e.g., limited) and therefore a safety of the electrical machine 25 and/or any electrically connected systems is enhanced. Each slot wedge 72 comprising the magnetic material (and therefore having a relatively high permanence) may provide more additional effective inductance to the stator windings 74 and therefore further limit the fault current induced in the stator windings 74. The additional effective inductance provided to the stator windings 74 may also be associated with advantages in the context of wide speed range PMSMs in which a field weakening operation can be implemented by means of external control of the electrical machine 25. In turn, this may improve a power and/or a speed range of the electrical machine 25.

This may be particularly advantageous if the electrical machine 25 is a permanent-magnet (PM) electrical machine 25 (such as a PMSM) in which the rotor 37 is directly coupled to a mechanical device which cannot readily be stopped in use. By way of example, the electrical machine 25 may be incorporated within a gas turbine engine 10 and the rotor 37 may be coupled to a spool/shaft of the gas turbine engine 10 which cannot readily be stopped in use.

In addition, the fault current being limited in the manner described above may help prevent the temperature of the electrical machine 25 rising outside of a design temperature-range tolerance when the electrical machine 25 is in the external short-circuit fault condition (e.g., the heat generated by the fault current within the electrical machine 25 may not exceed a cooling capacity of the electrical machine 25). This may yet further enhance the safety of the electrical machine 25 and/or allow the design temperature-range tolerance of the electrical machine 25 to be relatively reduced. In turn, this is associated with a lower complexity, a lower mass and/or an improved ease of manufacture of the electrical machine 25.

Figure 6A:
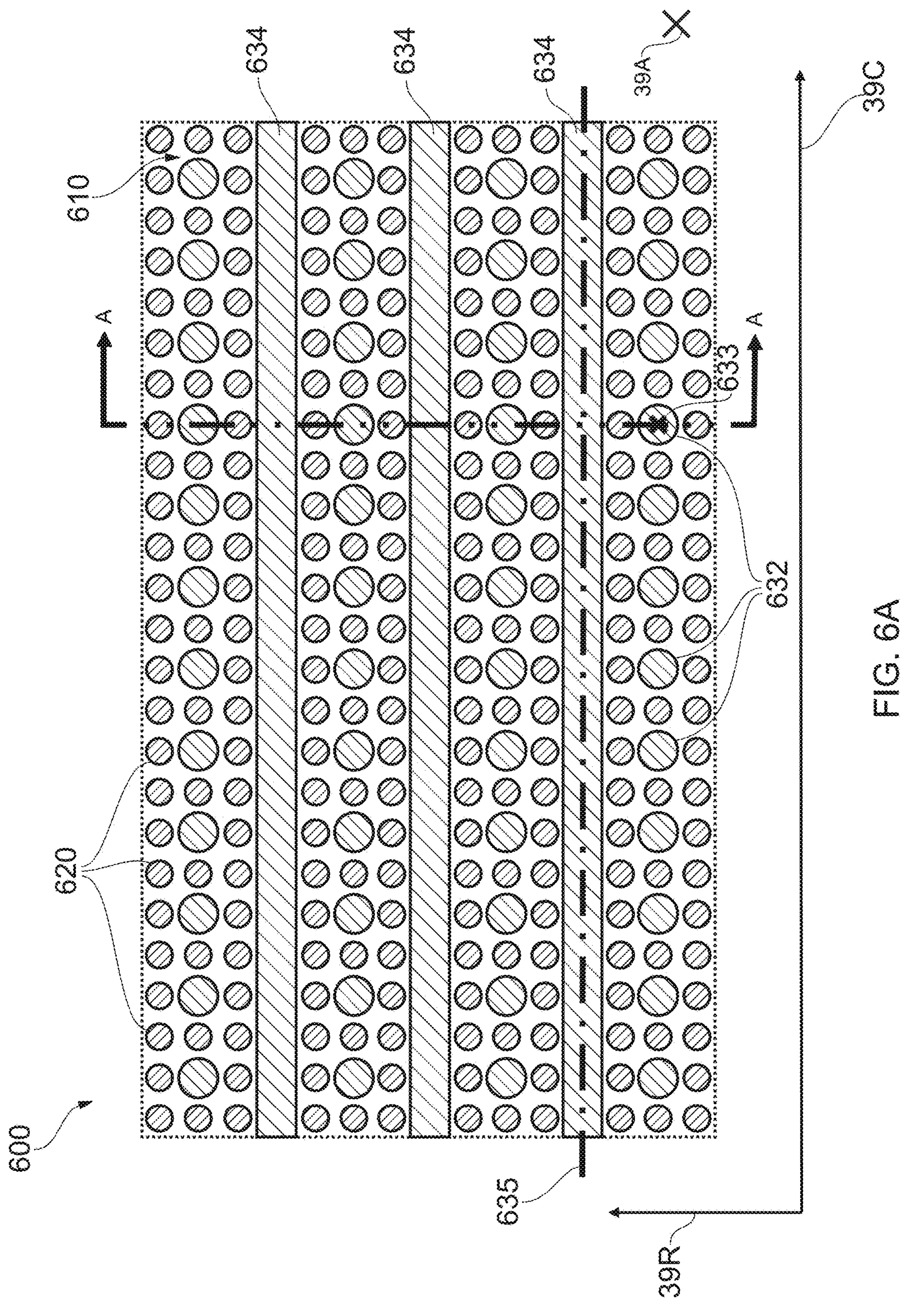
FIG. 6A is a detailed cross-section through a stator sleeve having a composite structure which includes a fibre reinforcement material comprising a plurality of reinforcing fibres arranged in respective directions

FIG. 6A shows a sectional view of a portion of a stator sleeve in accordance with the present disclosure (e.g., the stator sleeve 40 of FIGS. 4A-4C or a portion of the stator sleeve 80 of FIGS. 5A-5C) through a plane defined by the radial direction 39R and the circumferential direction 39C. Accordingly, the axial direction 39A extends through the plane. The stator sleeve 40, 80 has a composite structure 600 comprising a matrix 610, a filler 620 and a fibre reinforcement material 632, 634. In FIG. 6A, the fibre reinforcement material 632, 634 comprises a plurality of reinforcing fibres 632, 634. The expressions "fibre reinforcement material" 632, 634 and "reinforcing fibres" 632, 634 may be used interchangeably. The matrix 610 may also be referred to as a binder 610, as will be understood by those skilled in the art. The filler 620 and the reinforcing fibres 632, 634 are disposed within (e.g., distributed in) the matrix 610. The matrix 610 comprises a polymer resin which is configured to hold the reinforcing fibres 632, 634 and the filler 620 within the composite structure 600. The filler 620 comprises separate and individual filler regions 620 distributed in the matrix 610, each filler region 620 being at least partially surrounded by matrix 610 such that the matrix 610 separates the individual filler regions 620 to electrically insulate the individual filler regions 620. As discussed in further detail below, the individual filler regions may be, for instance, particulates or elongate wires.

The filler 620 comprises the magnetic material of the stator sleeve 40, 80. In other words, each of the individual filler regions 620 contain magnetic material as described above with reference to FIGS. 4A-5C. Forming the stator sleeve 40, 80 from a composite structure 600 as described herein ensures that the stator sleeve 40, 80 has a relatively high effective magnetic permeance while also allowing the mechanical and/or thermal properties of the stator sleeve to be optimised for use within an electrical machine 25.

With respect to mechanical properties, the stator sleeve 40, 80 is of sufficient strength to withstand fluid pressures that it may experience as a result of any pressure differential between the stator core 29, 50 and the rotor chamber 31. Further, it may be that there are strength constraints for the stator sleeve 40, 80 associated with reliable manufacture and assembly within the electrical machine 25. The arrangement of the composite structure 600 may be selected to ensure that the stator sleeve 40, 80 is able to reliably withstand internal stresses which arise as a result of such a pressure differential between the stator core 29, 50 and the rotor chamber 31 and/or to facilitate manufacturing and assembly of the electrical machine 25.

Turning now to thermal properties, the stator sleeve 40, 80 also provides a thermal barrier between the rotor chamber 31 and a coolant contained within or pumped around the stator core 29. If the rotor chamber 31 is likely to have a high operating temperature in use, the arrangement of the composite structure 600 may be selected to provide a high effective thermal resistance (i.e., a low effective thermal conductance) so as to reduce a rate of heat exchange between the rotor chamber 31 and the coolant and thereby minimise heating of the coolant in use. Conversely, if the rotor chamber 31 is likely to have a low operating temperature in use, the arrangement of the composite structure 600 may be selected to provide a low effective thermal resistance (i.e., a high effective thermal conductance) so as to increase a rate of heat exchange between the rotor chamber 31 and the coolant and thereby increase cooling of the coolant in use. To provide increased thermal conductance, a fraction of the composite structure 600 occupied by filler 620 may be increased and vice versa.

However, to ensure that the stator sleeve 40, 80 is of sufficient strength for use within an electrical machine 25 as discussed herein, the composite structure 600 contains no greater than 20% filler 620 by volume. Consequently, the matrix 610 and the fibre reinforcement material 632, 634 together occupy at least 80% of the composite structure 600 by volume. Optionally, the composite structure may contain no greater than 18% filler 620 by volume. If so, the matrix 610 and the plurality of reinforcing fibres 632, 634 together occupy at least 82% of the composite structure 600 by volume. More generally, the matrix 610 and the fibre reinforcement material 632, 634 may together occupy no greater than 95% of the composite structure 600 by volume, such that the filler 620 (containing the magnetic material) occupies at least 5% of the composite structure by volume. This may ensure that the effective magnetic permeance of the stator sleeve 40, 80 is sufficiently high for the purposes of the present disclosure.

By virtue of its inherently high electrical resistivity (as a polymer resin), the matrix 610 electrically insulates each filler region 620. By ensuring that each filler region 620 is electrically insulated, resistive losses within the filler 620 due to eddy currents induced therein by the moving magnetic flux associated with the rotor 37 are minimised. This increases an efficiency of the electrical machine 25 in which the stator sleeve 40, 80 is included.

The matrix 610 preferably comprises a thermosetting polymer resin such as an epoxy-based polymer resin or a cyanate-ester based polymer resin. The thermosetting polymer resin may include, for instance, silicone, polyamide or polyimide. Thermosetting polymer resins typically have a significantly lower viscosity (when in a liquid form) relative to comparable thermoplastic resins (when in a liquid form). The lower viscosity of such thermosetting polymer resins enables the individual filler regions 620 to be easily distributed throughout (e.g., mixed within) the matrix 610 during a manufacturing process of the composite structure 600 for the stator sleeve 40, 80 while the matrix 610 is in a liquid or flowable form. In turn, this provides the stator sleeve 40, 80 with a more uniform magnetic permeance.

In general, the composite structure 600 may be manufactured by a filament winding process in which the reinforcing fibres 632, 634 are impregnated with matrix 610 and wound to form a laminate arrangement on a rotating mandrel that defines the interior surface 44 of the stator sleeve 40, 80. The filament winding process may be performed using computer numeric control (CNC). The individual filler regions 620 may be incorporated into a pre-impregnated reinforcing tape (commonly referred to as a “prepreg”), or alternatively incorporated with the matrix 610 and impregnated in-line as part of the filament winding process (which may be referred to as a “wet-winding” process).

Each reinforcing fibre 632, 634 provides increased tensile strength to the composite structure 600 in a direction along which a centreline of the reinforcing fibre 632, 634 extends. For this purpose, each reinforcing fibre 632, 634 is formed from a structure having a relatively high tensile strength (e.g., yield strength). To this end, the fibre reinforcement material 632, 634 may generally include ceramic fibres. In particular, the fibre reinforcement material 632, 634 may comprise glass fibres and/or carbon fibres.

In the example FIG. 6A, the fibre reinforcement material 632, 634 includes a plurality of fibres 634 (e.g., at least one fibre 634) having respective centrelines 635 which extend along the circumferential direction 39C of the stator sleeve 40, 80. Therefore, the fibres 634 are elongate along the circumferential direction 39C. Accordingly, these reinforcing fibres 634 may be referred to as circumferentially-extending fibres 634. This increases a tensile stress of the composite structure 600 (and therefore the stator sleeve 40, 80) in the circumferential direction 39C. The stator sleeve 40, 80 is therefore better able to withstand stresses in the circumferential direction 39C (which may be referred to as circumferential stresses or hoop stresses). As will be appreciated by those skilled in the art, any internal stresses which arise within the stator sleeve 40, 80 as a result of a pressure differential between the stator core 29, 50 and the rotor chamber 31 may be particularly large (e.g., greatest) in the circumferential direction 39C. Accordingly, inclusion of the circumferentially-extending reinforcing fibres 634 increases a durability of the stator sleeve 40, 80 in the context of an electrical machine 25 as discussed herein.

Also in the example FIG. 6A, the fibre reinforcement material 632, 634 includes a plurality of fibres 632 (e.g. at least one fibre 632) having respective centrelines 633 which extend along the axial direction 39A of the stator sleeve 40, 80. Therefore, the fibres 632 are elongate along the axial direction 39A and are therefore elongate along the rotational axis 39 or the rotor 37 when incorporated within an electrical machine. Accordingly, these reinforcing fibres 632 may be referred to as axially-extending fibres 632. This increases a tensile stress of the composite structure 600 (and therefore the stator sleeve 40, 80) in the axial direction 39A. The stator sleeve 40, 80 is therefore better able to withstand stresses in the axial direction 39A (which may be referred to as axial stresses). Internal stresses which arise within the stator sleeve 40, 80 as a result of a pressure differential between the stator core 29, 50 and the rotor chamber 31 may be relatively large (e.g., second greatest) in the axial direction 39A. Accordingly, inclusion of the axially-extending reinforcing fibres 632 increases a durability of the stator sleeve 40, 80 in the context of an electrical machine 25 as discussed herein.

Although the composite structure 600 has been described as containing both a plurality of reinforcing fibres 632 having centrelines 633 which extend along the axial direction 39A of the stator sleeve 40, 80 and a plurality of reinforcing fibres 634 having centrelines 635 which extend along the circumferential direction 39C of the stator sleeve 40, 70, this need not necessarily be the case. For example, it may be that the composite structure 600 only comprises reinforcing fibres 632 having respective centrelines 633 which extend along the axial direction 39A or only comprises reinforcing fibres 634 having respective centrelines 635 which extend along the circumferential direction 39C.

Figures 6B, 6C:
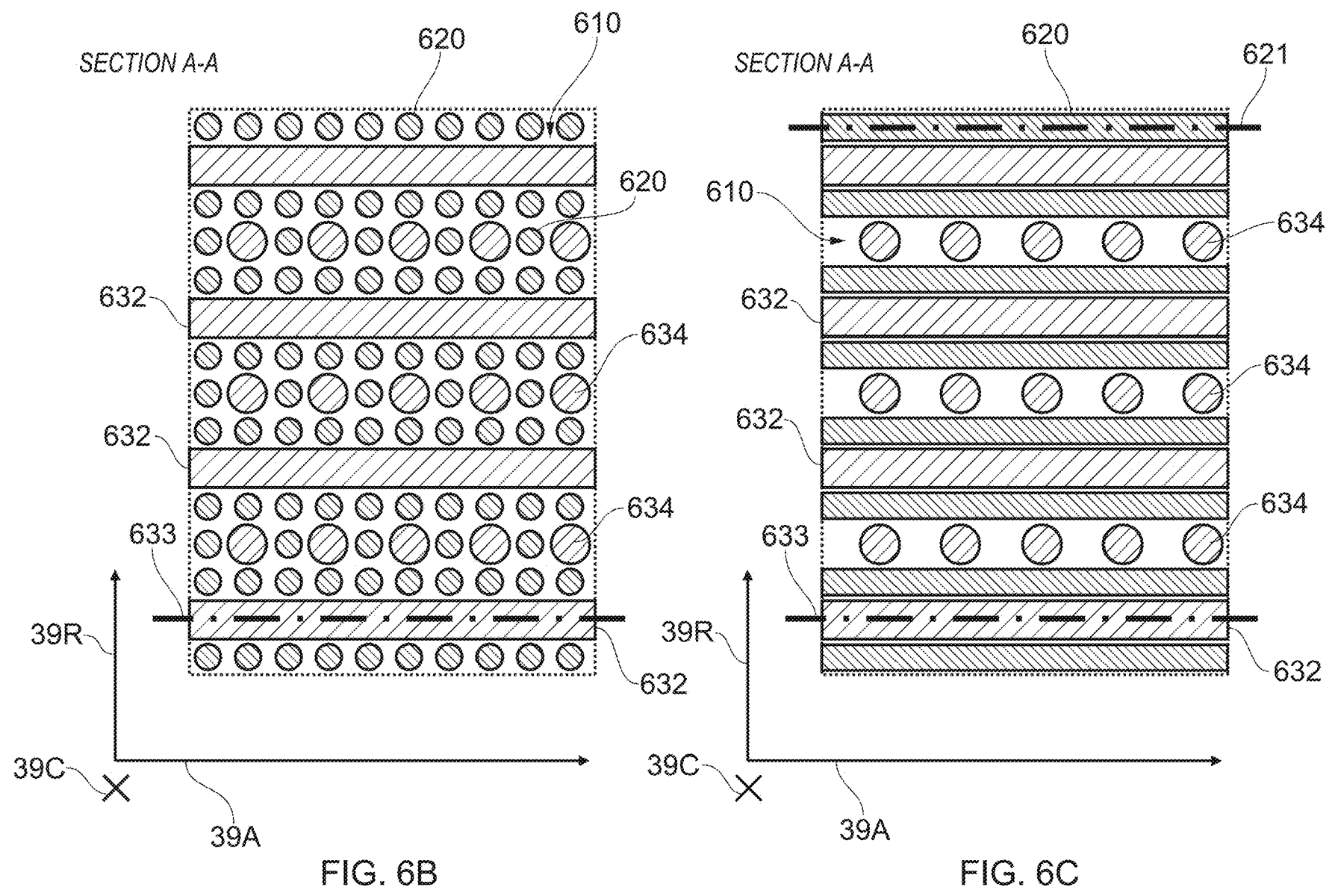

FIG. 6B shows a cross-sectional view of a portion of a stator sleeve in accordance with the present disclosure (e.g., the stator sleeve 40 of FIGS. 4A-4C or a portion of the stator sleeve 80 of FIGS. 5A-5C) through a plane as indicated by section A-A on FIG. 6A. In the example of FIG. 6B, the filler 620 is distributed throughout the matrix 610 in the form of particulates 620 (e.g., separate interspersed regions within the matrix 610), each particulate 620 being surrounded and electrically insulated by the matrix 610. Distributing the filler 620 throughout the matrix 610 in the form of particulates enables the magnetic material contained within the filler 620 to be more evenly and uniformly provided throughout the stator sleeve 40, 80. For example, as may be seen in FIGS. 6A and 6B, particulates 620 may be provided between pairs of substantially parallel axially-extending reinforcing fibres 632 as well as between pairs of substantially parallel circumferentially-extending fibres 634. This may increase a uniformity of, for instance, a relative permeability of the stator sleeve 40, 80 and/or an effective intrinsic magnetic coercivity of the stator sleeve 40, 80. In turn, this is associated with better electromagnetic performance of the stator sleeve 40, 80 in the context of an electrical machine 25 as described herein.

FIG. 6C shows another cross-sectional view of a portion of a stator sleeve in accordance with the present disclosure (e.g., the stator sleeve 40 of FIGS. 4A-4C or a portion of the stator sleeve 80 of FIGS. 5A-5C) through a plane as indicated by section A-A on FIG. 6A. In the example of FIG. 6C, the filler 620 is distributed throughout the matrix 610 in the form of elongate wires 620, each elongate wire 620 having a centreline 621 which extends along the axial direction 39A of the stator sleeve 40, 80. Further, each elongate wire 620 is electrically insulated by the matrix 610.

Figure 7:
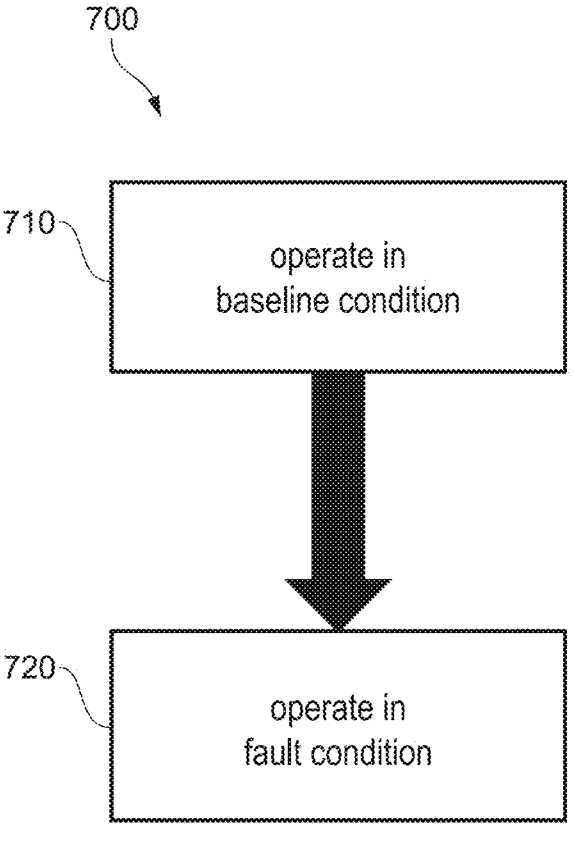
FIG. 7 is a flowchart which shows an example method of operating an electrical machine having a stator sleeve.

FIG. 7 is a flowchart which shows a method 700 of operating an electrical machine 25 having a stator sleeve 40, 80 as described herein. The method includes, at block 710, operating the electrical machine 25 in a baseline condition. In the baseline condition, the electrical machine 25 may be operated to drive the rotor 37 to rotate about the rotational axis 39 (and thereby operate as a motor). Otherwise, in the baseline condition, the electrical machine may be operated to extract mechanical work from the rotor 37 (and thereby operate as a generator). For these purposes, an appropriate electrical current is supplied to the stator windings 47 (e.g., an alternating electrical current so that the electrical machine 25 may function as a synchronous electrical machine) when operating as a motor and an appropriate electrical current is drawn from the stator windings 47 when operating as a generator.

The method also includes, at block 720, operating the electrical machine 25 in a fault condition (e.g., an electrical short-circuit fault condition external to the machines winding). In the external short-circuit fault condition, the stator windings 74 are connected to each other to form a short-circuit (e.g., as a result of a set of terminals which are configured to connect the external load to the stator windings 74 of the electrical machine 25 being connected to each other). As discussed in detail above, the stator sleeve 40, 80 having a relatively high permeance as a result of comprising a magnetic material provides additional effective inductance to the stator windings 74. As a result, the fault current induced within the stator windings 74 when the electrical machine 25 is in the external short-circuit fault condition is inhibited and therefore relatively small (e.g., limited). As is known in the art, a fault condition as described above may arise without specific control action (e.g., spontaneously or unexpectedly), and the method is presented in this light, and thereby the method is to be understood as reflecting the capability of the electrical machine to be operated in both the baseline condition and in the fault condition, rather than a method of causing a fault condition to arise.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

It will also be appreciated that whilst the invention has been described with reference to aircraft and aircraft propulsion systems, the electric machine drive techniques described herein could be used for many other applications. These include, but are not limited to, automotive, marine and land-based applications.

The invention claimed is:

1. An electrical machine comprising:

a rotor at least partially disposed within a rotor chamber, a stator core coaxially arranged with the rotor chamber, and a stator sleeve, wherein the stator sleeve is annular and is positioned between the stator core and the rotor chamber;

wherein the stator sleeve comprises a magnetic material having a relative permeability of at least 10 and an intrinsic coercivity no greater than 1 $kAm^{-1}$;

wherein the stator sleeve has a composite structure comprising a matrix and a filler distributed in the matrix, wherein the filler comprises the magnetic material; and wherein the filler comprises particulates distributed in the matrix, wherein the matrix separates the particulates to electrically insulate the particulates.

2. The electrical machine of claim 1, wherein the magnetic material comprises iron.

3. The electrical machine of claim 2, wherein the magnetic material comprises an iron-cobalt alloy.

4. The electrical machine of claim 1, wherein the magnetic material comprises at least one of nickel or a nickel-iron alloy.

5. The electrical machine of claim 1, wherein the composite structure further comprises a fibre reinforcement material disposed within the matrix.

6. The electrical machine of claim 5, wherein the matrix and the fibre reinforcement material together occupy at least 80% of the composite structure by volume.

7. The electrical machine of claim 5, wherein the fibre reinforcement material comprises at least one of glass fibres or carbon fibres.

8. The electrical machine of claim 5, wherein:

the stator sleeve is concentric with a rotational axis of the rotor; and the fibre reinforcement material comprises fibres which are elongate along the rotational axis.

9. The electrical machine of claim 5, wherein:
the stator sleeve is defined by a circumferential direction;
the fibre reinforcement material comprises a plurality of fibres which are elongate along the circumferential direction.

10. The electrical machine of claim 1, wherein the matrix comprises a polymer resin.

11. The electrical machine of claim 10, wherein the matrix comprises a thermosetting polymer resin.

12. The electrical machine of claim 11, wherein:
the thermosetting polymer resin is at least one of an epoxy-based resin or cyanate-ester based resin; and
the thermosetting polymer resin comprises at least one of silicone, polyamide or polyimide.

13. The electrical machine of claim 1, wherein the stator sleeve provides a fluid seal between the rotor chamber and the stator core.

14. The electrical machine of claim 1, wherein:
the stator core defines a plurality of stator core slots;
the stator sleeve comprises a plurality of slot wedges; and
the stator core and the stator sleeve are mechanically engaged such that each slot wedge blocks an opening of a respective stator core slot.

15. The electrical machine of claim 14, wherein each slot wedge comprises a magnetic material having a relative permeability of at least 10 and an intrinsic coercivity no greater than 1 $kAm^{-1}$.

16. The electrical machine of claim 1, wherein
the stator core is disposed around the rotor chamber; or
the rotor chamber is disposed around the stator core.

17. A method of operating an electrical machine,
the electrical machine comprising: a rotor at least partially disposed within a rotor chamber, a stator core coaxially arranged with the rotor chamber and defining a plurality of stator core slots in which a respective stator winding is provided, and an annular stator sleeve positioned between the stator core and the rotor chamber, the stator sleeve comprising a magnetic material having a relative permeability of at least 10 and an intrinsic coercivity no greater than 1 $kAm^{-1}$,
the method comprising:
operating the electrical machine in a baseline condition; and
operating the electrical machine in a fault condition in which the stator windings are electrically connected to each other to form a short-circuit,
wherein the stator sleeve provides additional effective inductance to the stator windings such that a fault current induced within the stator windings is inhibited.

18. An electrical machine comprising:
a rotor at least partially disposed within a rotor chamber,
a stator core coaxially arranged with the rotor chamber, and
a stator sleeve,
wherein the stator sleeve is annular and is positioned between the stator core and the rotor chamber;
wherein the stator sleeve comprises a magnetic material having a relative permeability of at least 10 and an intrinsic coercivity no greater than 1 $kAm^{-1}$;
wherein the stator sleeve has a composite structure comprising a matrix and a filler distributed in the matrix, wherein the filler comprises the magnetic material; and
wherein the filler comprises elongate wires extending through the matrix, wherein the matrix separates the elongate wires to electrically insulate the elongate wires.

* * * * *